(12) United States Patent
Obersteiner et al.

(10) Patent No.: US 8,146,490 B2
(45) Date of Patent: Apr. 3, 2012

(54) JUICE EXTRACTOR WITH ADAPTED PUSHER

(75) Inventors: Heimo Obersteiner, Klagenfurt (AT); Werner Murbacher, Velden (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 350 days.

(21) Appl. No.: 12/514,453

(22) PCT Filed: Nov. 14, 2007

(86) PCT No.: PCT/IB2007/054624
§ 371 (c)(1),
(2), (4) Date: May 12, 2009

(87) PCT Pub. No.: WO2008/062345
PCT Pub. Date: May 29, 2008

(65) Prior Publication Data
US 2010/0050886 A1   Mar. 4, 2010

(30) Foreign Application Priority Data
Nov. 20, 2006   (EP) ..................................... 06124416

(51) Int. Cl.
*A23N 1/00* (2006.01)
*B02C 4/06* (2006.01)
*B02C 19/20* (2006.01)
*B02C 15/00* (2006.01)
*B02C 17/02* (2006.01)

(52) U.S. Cl. ................. 99/510; 99/511; 99/513; 241/92; 241/273.2; 241/273.3; 241/282.2

(58) Field of Classification Search .................... 99/510, 99/511, 513; 241/37.5, 92, 83, 84, 273, 273.1, 241/273.2, 273.3, 282.1, 282.2
See application file for complete search history.

(56) References Cited

U.S. PATENT DOCUMENTS

| | | | | |
|---|---|---|---|---|
| 3,032,087 | A | * | 5/1962 | Rodwick .......................... 241/92 |
| 4,117,980 | A | * | 10/1978 | Hartmann ..................... 241/37.5 |
| 4,544,103 | A | * | 10/1985 | Breeden ........................ 241/37.5 |
| 4,572,445 | A | | 2/1986 | Cristante |
| 5,355,784 | A | * | 10/1994 | Franklin et al. .................. 99/492 |
| 5,479,851 | A | * | 1/1996 | McClean et al. ................. 99/512 |
| 6,543,340 | B1 | * | 4/2003 | Fouquet .......................... 99/511 |
| 6,813,997 | B1 | * | 11/2004 | Lin .................................. 99/511 |
| 7,481,155 | B2 | * | 1/2009 | Larsen ............................ 99/511 |

FOREIGN PATENT DOCUMENTS
WO   2005099531 A1   10/2005
* cited by examiner

*Primary Examiner* — Sebastiano Passaniti

(57) ABSTRACT

A juice extractor (100), in particular for fruit and vegetable, comprising a rotatable grating disk (106), a filter sieve (108) surrounding the grating disk (106), a feed tube (114a, 114b) arranged above the grating disk (106), and a food pusher (116) insertable into the feed tube (114a, 114b) to press food, in particular fruit and vegetable, onto the grating disk (106), wherein the food pusher (116) is hollow with an opening on its side and the feed tube (114a, 114b) has an corresponding opening, such that pulp generated during grating food may enter the food pusher (116). Separate containers for collecting pulp become thus obsolete. This allows for a more compact design of juice extractors (100).

8 Claims, 6 Drawing Sheets

Figure 1A:
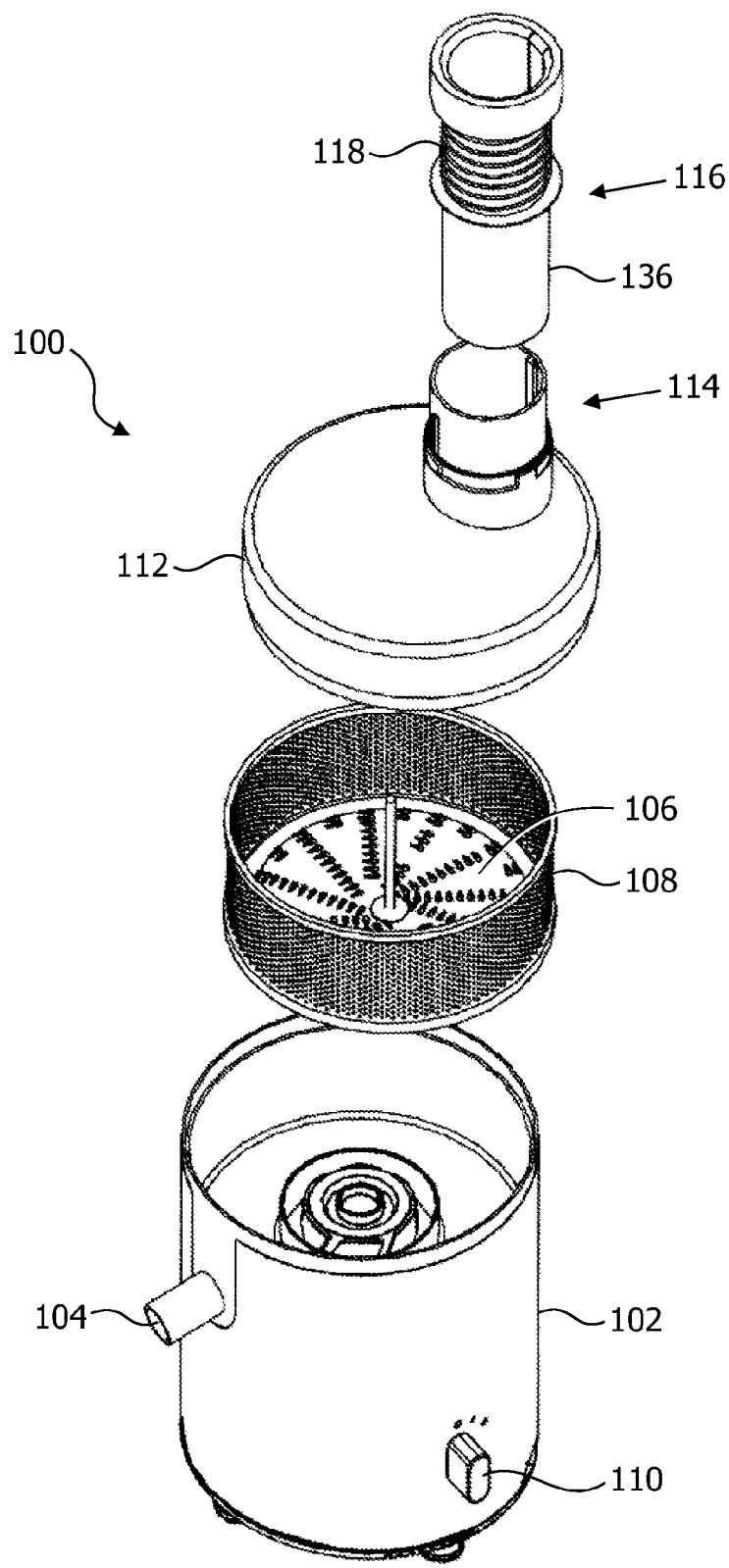

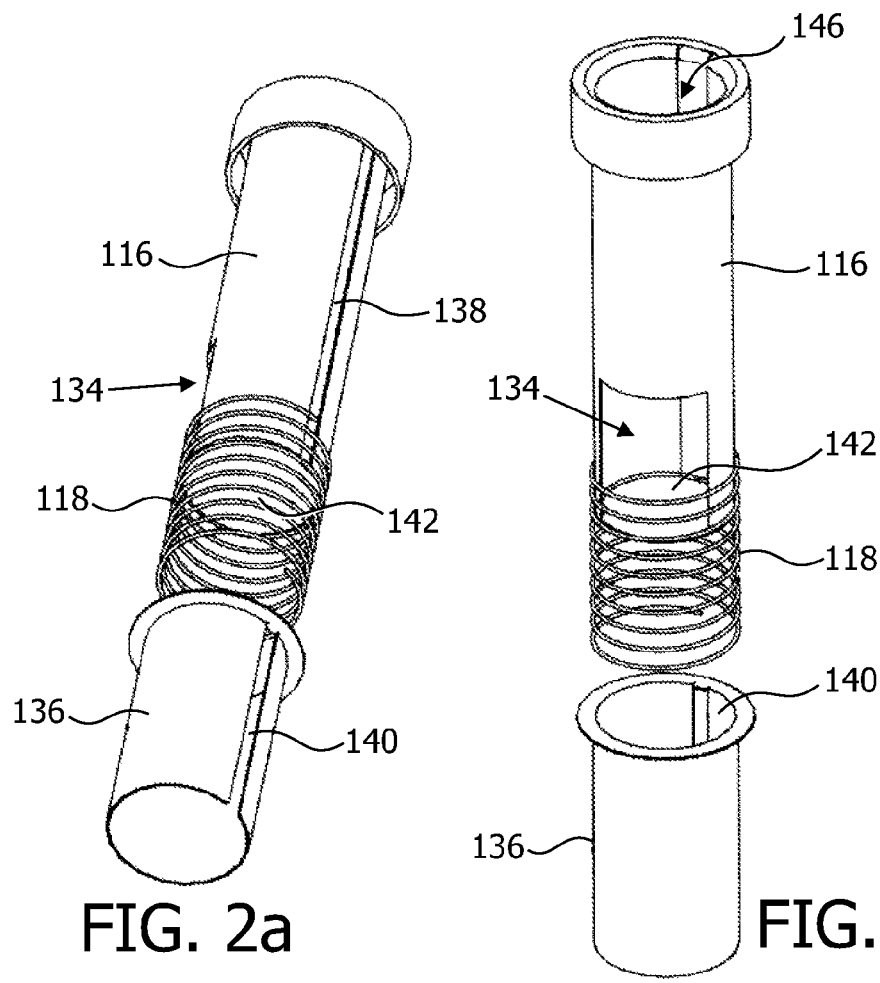
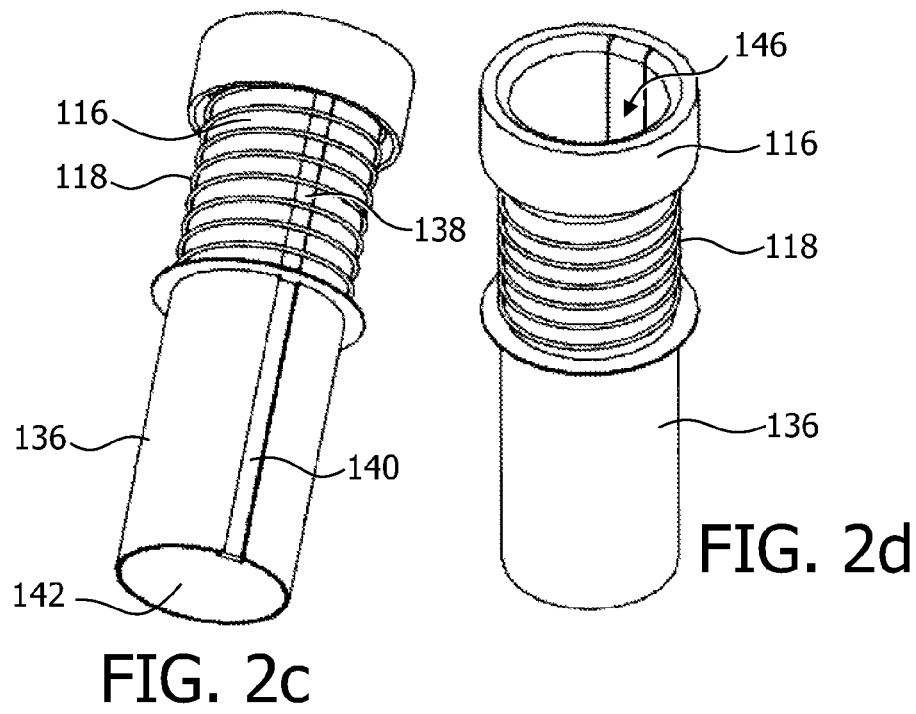
FIG. 2a  FIG. 2b  FIG. 2c  FIG. 2d

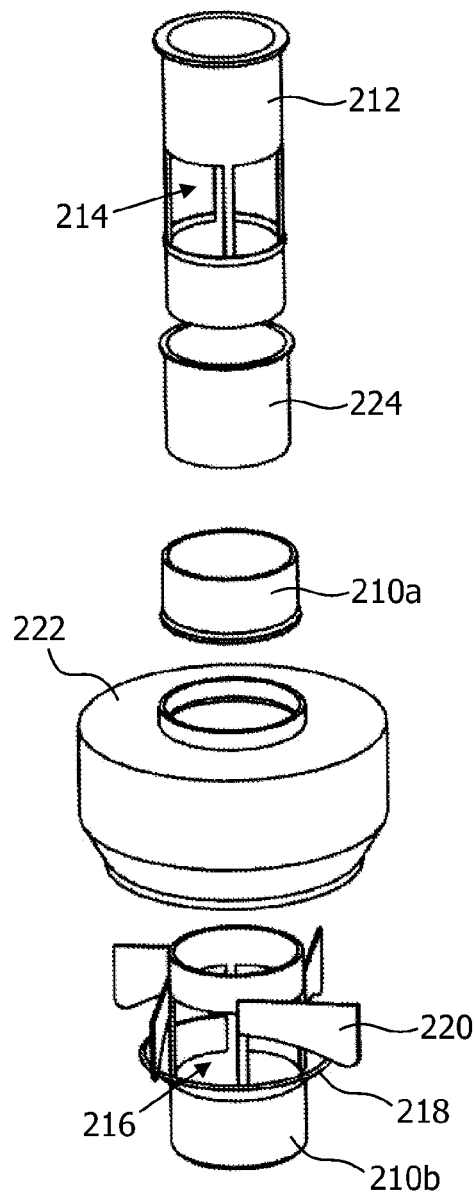
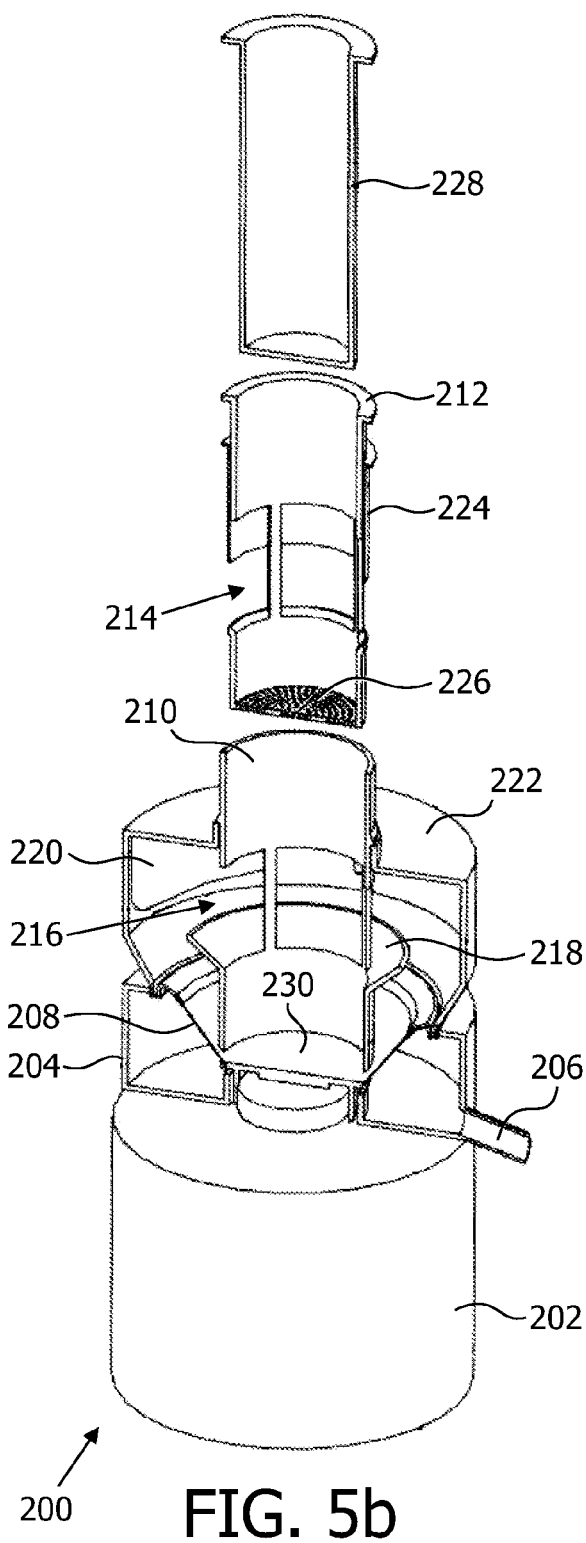
FIG. 5a
FIG. 5b

JUICE EXTRACTOR WITH ADAPTED PUSHER

The present invention relates to a juice extractor, in particular for fruit and vegetable, comprising a rotatable grating disk, a filter sieve surrounding the grating disk, a feed tube arranged above the grating disk, and a food pusher insertable into the feed tube to press food, in particular fruit and vegetable, onto the grating disk.

In juice extractors using a grating disk, juice is extracted from e.g. a fruit or a vegetable by pressing it onto the rotating grating disk, which grates material from the surface of the fruit or vegetable at the same time releasing the juice. The grated material and the juice are thrown upwardly and outwardly by centrifugal force against the surface of a filter surrounding the grating disk. The pulp carries on over the edge of the filter and is caught in a suitable receptacle. The finely filtered juice passes through the filter into another receptacle. In general, juice extractors have an inlet piece opening out just over the grating disk and having a diameter smaller than the grating disk in order to ensure that the food to be processed is held against the rotation of the grating disk. In order to make good use of the surface of the grating disk the diameter of the inlet piece is, in general, only slightly smaller than the diameter of the grating disk.

Examples for juice extractors are inter alia described in U.S. Pat. No. 6,813,997 B1. They comprise a pushing element, a top cover, a disc blade, a machine body and a residue container for collecting the pulp. If vegetables and fruit are placed into the feeding cylinder and the pushing component is inserted into the feeding cylinder the fruit and vegetables are pressed against the toothed blade of the blade disc. There, the fruit and vegetables are crushed into juice and pulp. The juice is filtered by a filter, so that the purified juice is collected into a container, whereas the pulp is thrown into the residue container.

It is an object to provide a juice extractor with a compact design.

This object is achieved by a juice extractor, in particular for fruit and vegetable, comprising a rotatable grating disk, a filter sieve surrounding the grating disk, a feed tube arranged above the grating disk, and a food pusher insertable into the feed tube to press food, in particular fruit and vegetable, onto the grating disk, characterized in that the food pusher is hollow with an opening on its side and in that the feed tube has an corresponding opening, such that pulp generated during grating food may enter the food pusher.

By providing space inside the food pusher for collecting the pulp no separate container for collecting the pulp is necessary any more, thus allowing for a compact design of the juice extractor that needs very little space. Every time, new food is fed into the feeding tube, the food pusher will be extracted out of the feeding tube to fill in the fresh food. If necessary every time, the food pusher can be emptied from the pulp inside it within seconds. Then, the pusher will be inserted again into the feed tube to push the food against the grating disk for extracting juice, while simultaneously collecting the pulp coming in through the openings in the side of the pusher and the feed tube. Preferably, the openings in the feed tube and the food pusher are more or less commensurate and arranged to be positioned one on the other. The size of the openings will be chosen to collect a maximum of pulp while still efficiently guiding the food through the feed tube and pressing it against the grating disk.

In some preferred embodiments of the present invention, the juice extractor further comprises a cover element covering the filter sieve and the part of the feed tube with the opening, the cover element having a deflecting element to deflect pulp during grating through the openings into the food pusher. In other preferred embodiments, the feed tube has a deflecting element to deflect pulp during grating through the openings into the food pusher. The one or more deflecting elements have a function comparable to a wall for a ball. The pulp sputtered around by centrifugal forces splashes against the deflecting element and "rebounds" from the deflecting element into another direction. The deflecting element is oriented to deviate the pulp in direction of the side openings of the feed tube and the food pusher.

Advantageously, the feed tube has a scraper element to scrape pulp from the filter sieve's inner side. The scraper element has two main advantageous functions. By scraping pulp from the filter sieve's inner side, it avoids clogging of the filter sieve by the pulp. Besides, the scraped pulp can be additionally collected inside the food pusher. Apart from the feed tube, the scraper element can be arranged on some cover element or housing of the juice extractor as well. The effect of the scraper element can be enhanced by using more than one scraper element. Preferably, the presence of a scraper element is combined with the presence of a deflecting element to further improve the collecting efficiency of the juice extractor according to the present invention.

In preferred embodiments, the feed tube is designed to be rotated between a first position for introducing food and grating it and a second position, wherein the scraper element abuts against the inner side of the filter sieve. This allows for scraping pulp from the filter sieve only when necessary, e.g. when clogging is imminent. The other time, the juicing and filtering can proceed unimpeded by the scraper element. Preferably, the feed tube has a resilient element forcing the tube back from the second into the first position. So, the default position is the position for juice extraction. When cleaning of the filter sieve is needed, the feed tube may be e.g. manually rotated around a certain angle, until the scraper element is in scraping position against the inner side of the filter sieve and hold there during the scraping of the pulp. As soon as enough pulp has been removed from the filter sieve, the feed tube is released and moves back into the juicing position. This makes the juice extractor quite easy to handle for cleaning. No longsome interruption of the juicing process is necessary for cleaning the filter sieve.

Advantageously, the filter sieve and the grating disk are integral, i.e. coupled in a way with each other, that when the grating disk is rotating, the filter sieve is rotating as well, together with the grating disk. This considerably enhances the centrifugal forces acting on the juice and the pulp. In particular the pulp will be easier to collect. In case of the presence of a scraper element, with only one scraper element and without any additional driving means, it is possible to clean the whole circumference of the inner side of the filter sieve.

Preferably, the food pusher and/or the feed tube has stopping means ensuring that the food pusher and the feed tube cannot be rotated with respect to each other. This makes sure that the opening in the side of the feed tube and the opening in the side of the food pusher are always arranged with respect to each other to provide a constant width, preferably the largest possible width.

Advantageously, the food pusher comprises a slidable sleeve encompassing the food pusher, the sleeve being slidable between a first position closing the opening and a second position leaving the opening in the side of the food pusher open. The sleeve is in the second position, when the food pusher is inserted into the feed tube to push the food against the grating disk and collect the pulp. It is preferable to displace the sleeve into the first position, when extracting the food pusher from the feed tube to avoid spilling accidentally the pulp. For emptying the food pusher from the pulp, the sleeve can be displaced again into the second position, in which the opening in the side of the food pusher is open. Preferably, the food pusher comprises a resilient element forcing the sleeve back from the second position into the first position to assist and facilitate the displacement of the sleeve and avoidance of unintentional spilling of the pulp from inside the food pusher.

Figure 3A:
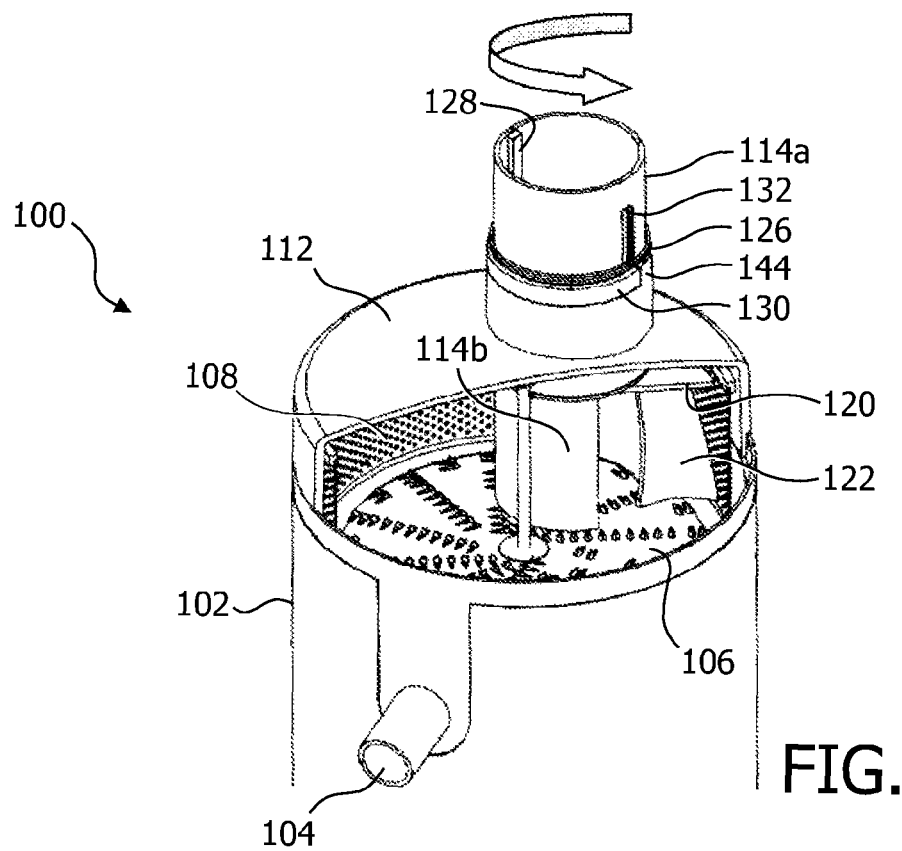
Figure 4A:
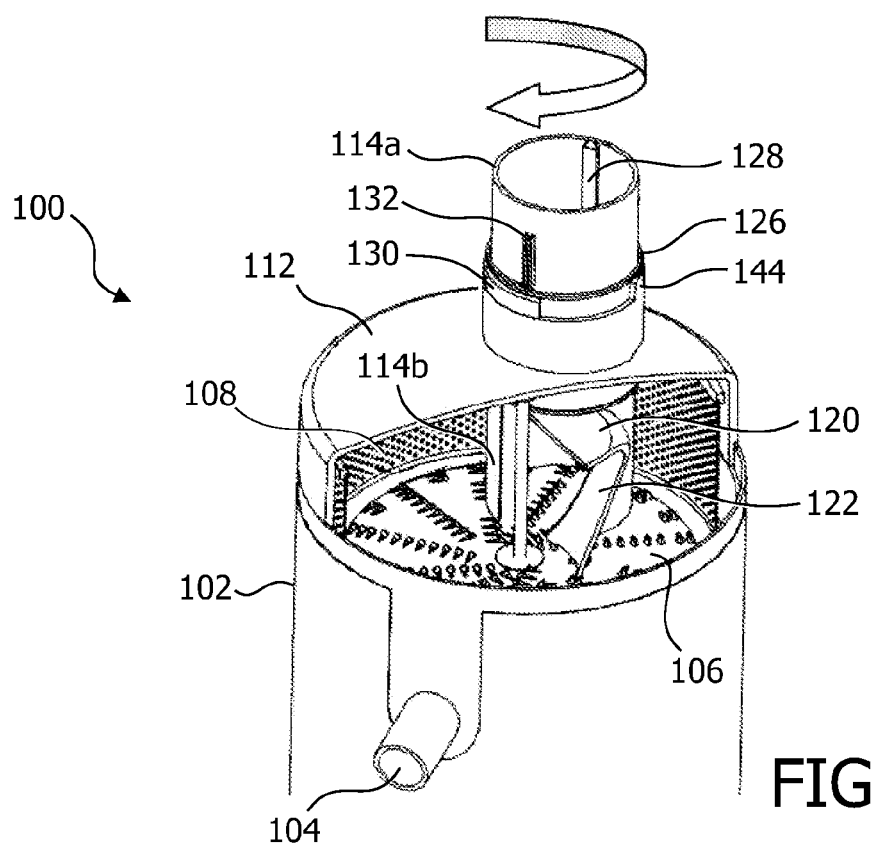

A detailed description of the invention is provided below. Said description is provided by way of a non-limiting example to be read with reference to the attached drawings in which:

FIGS. 1a,b show a first embodiment of a juice extractor in exploded view;

FIGS. 2a-d show a food pusher in different positions;

FIGS. 3a,b show the juice extractor of FIGS. 1a,b in a partially cut view in a cleaning position with and without food pusher;

FIGS. 4a,b show the juice extractor of FIGS. 1a,b in a partially cut view in a juicing position with and without food pusher; and FIGS. 5a,b show a second embodiment of a juice extractor in exploded view.

The present invention will be explained more in detail with respect to two different juicers. A first juicer 100 is shown in an exploded view in FIG. 1a. The juicer 100 comprises a housing 102 that contains a motor (not shown) for rotatably driving the grating disk 106. The housing 102 has furthermore the function to receive the juice of fruits or vegetables that have been grated by the grating disk 106 and centrifuged and filtered by the filter sieve 108. The fresh juice is than poured into e.g. a drinking glass through the spout 104. The housing 102 comprises a switch for switching the juicer 100 on or off and change the velocity of the grating disk 106.

The grating disk 106 and the filter sieve 108 are integral and inserted in the housing 102. When the grating disk 106 rotates around its middle axis, the filter sieve 108 rotates as well. This improves the effect of the centrifugal forces acting on the juice and the pulp and, thus, improves the effect of separation of juice on the one hand and pulp on the other hand. The grating disk 106 and the filter sieve 108 being an integral component, this simplifies assembling and disassembling the juicer 100 for the user.

The housing 102 with the filter sieve 108 and the grating disk 106 is closed by the cover 112 to avoid that juice and pulp are ejected out of the juicer 100. The cover 112 is connected with the feed tube 114 through which fruits or vegetable are fed to the grating disk 106. To improve the grating efficiency, the fruits or vegetables are pushed against the grating disk 106 with help of the food pusher 116. The food pusher 116 is surrounded with a sleeve 136 and a spiral spring 118. Preferably, the cover 112 is transparent to allow the user to look into the juicer 100.

Figure 1B:
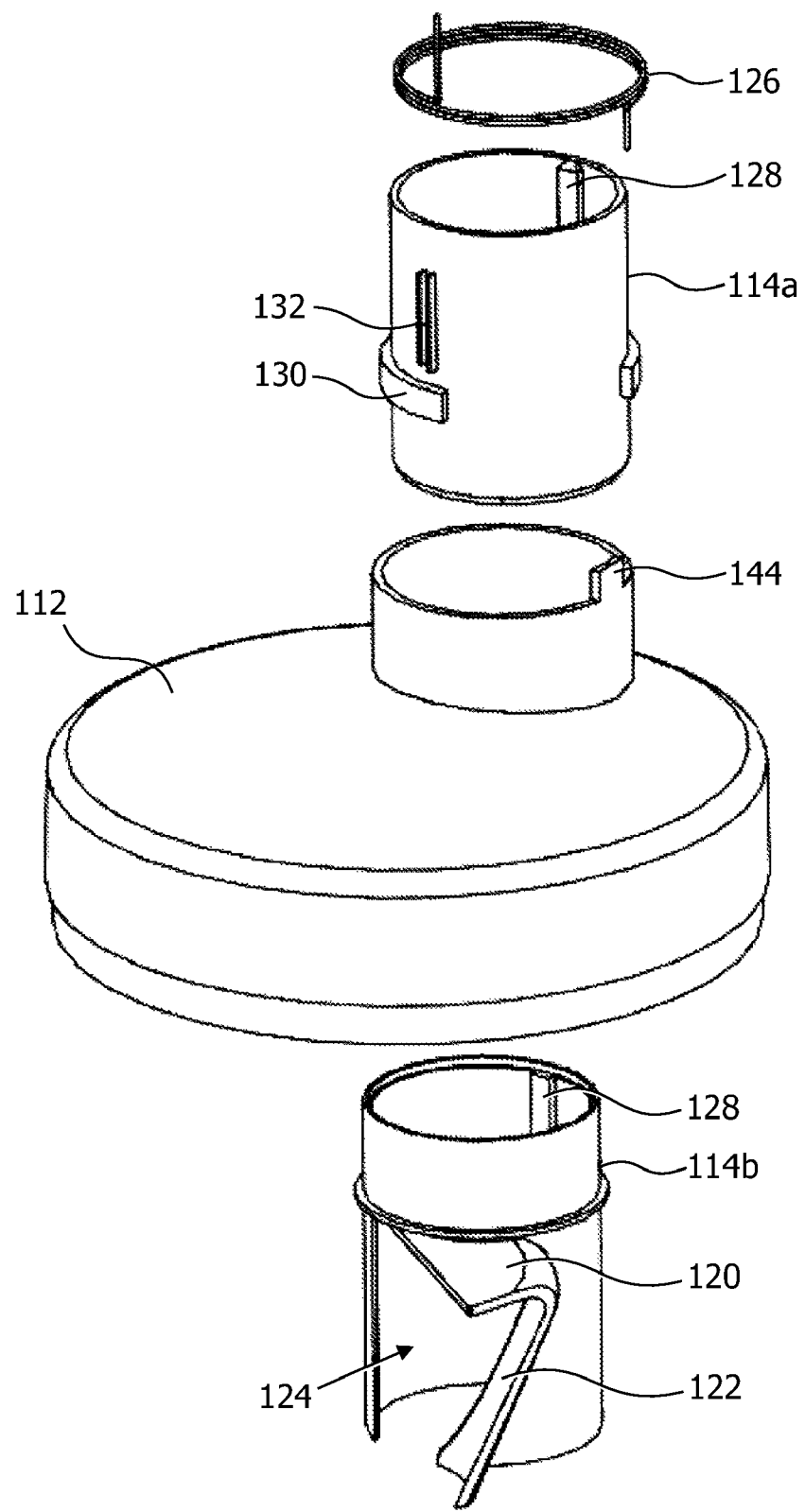

In FIG. 1b, the assembly of the cover 112 and the feed tube 114 is shown more in detail. The feed tube consists of two main parts, an upper part 114a protruding to the exterior of the juicer and a lower part 114b protruding to the interior of the juicer. The lower part 114b contains the opening 124 through which pulp can enter inside the food pusher. Adjacent to the opening 124 are the deflecting element 120 and the scraper element 122. The deflecting element 120 works similarly to a reflector for the pulp accelerated against it during juice extraction and deviates the pulp in direction of the opening 124. During juice extraction, the scraper element 122 assists the deflecting element 120 in deviation pulp in direction of the opening 124. During cleaning, the scraper element 122 is run along the inner side of the filter sieve to scrape off pulp that has accumulated there and clogs the filter sieve.

The means for rotating the feed tube into the cleaning or the juice extracting position are provided on the upper part 114a of the feed tube. A peripheral protrusion 130 cooperates with the abutment 144, the abutment 144 being part of the cover 112, to define a maximum angle of rotation. In the present example, the feed tube 114a,b may be rotated by approximately 80° around its middle axis to be either in the cleaning position or in the juicing position (see also FIGS. 3a,b, 4a,b). The default position is the juicing position. To provide an automatic switch back into the default position from the cleaning position, the upper part 114a of the feed tube and the cover 112 are coupled with each other by a spring 126. One end of the spring 126 is fixed on the upper part 114a of the feed tube in the protruding groove 132, the other end of the spring 126 is fixed to the cover 112 (see also FIGS. 3a,b, 4a,b). The spring 126 is oriented in such a way that the rotation of the feed tube 114a,b is in the direction against the spring force. As soon as the user releases the feed tube 114a,b, the spring force moves it back into the juicing position.

Both parts 114a, 114b of the feed tube show a longitudinal protrusion 128. This longitudinal protrusion 128 cooperates with a corresponding groove in the food pusher to avoid that the food pusher and the feed tube and with them their openings are skewed relatively to each other. This would lead to a smaller or even closed resulting opening to the inner of the food pusher and would lower the efficiency of collecting the pulp or even prevent it.

The food pusher 116 is shown more in detail in FIGS. 2a-d. FIGS. 2a,b show the food pusher 116 during assembly form different perspectives, FIGS. 2c,d show the assembled food pusher 116 from different perspectives.

The food pusher 116 has an opening 134 on its side to collect pulp inside the food pusher 116. To avoid spilling the pulp contained inside the food pusher 116 when taking it out of the juicer, e.g. for emptying it, the food pusher is surrounded by a sleeve 136. The sleeve 136 can be arranged in two different positions. The first and default positions is the one shown in FIGS. 2c,d, where the sleeve 136 covers the opening 134 of the food pusher 116. In the other position, the sleeve 136 is moved to the other end of the food pusher 116, thus freeing the opening 134. By providing the spring 118 around the food pusher 116, the sleeve 136 has to be moved against the spring force from the first into the second position, and as soon as the user releases the sleeve 136, it moves back into the first position due to the force of spring 118. The sleeve 136 is preferably made from metal to make it very thin. The food pusher 116 as well as the feed tube 114 is preferably made from plastic material that is easily cleaned and low cost.

Both, the sleeve 136 and the food pusher 116 have a longitudinal groove 138, 140 that cooperates with the longitudinal protrusion 128 of the feed tube 114a,b shown in FIG. 1b. During juicing, when fruits or vegetables are pressed against the grating disk with the bottom 142 of the food pusher 116, and during cleaning it is thus always ensured that the opening 134 of the food pusher 116 and the opening 124 of the feed tube 114a,b (see FIG. 1b) stay aligned for optimal collecting of pulp.

It will be noted, that besides pressing food against the grating disk, an important function of the bottom 142 of the food pusher 116 is to allow removing the collected pulp by removing the food pusher 116 out of the feed tube. The food pusher 116 can than be emptied e.g. by sliding the sleeve 16 away to open the opening 134 and removing the pulp through the opening 134. Another possibility of emptying the food pusher 116 is to remove the pulp through the upper opening 146 of the food pusher 116 by turning the food pusher 116 over.

Figure 3B:
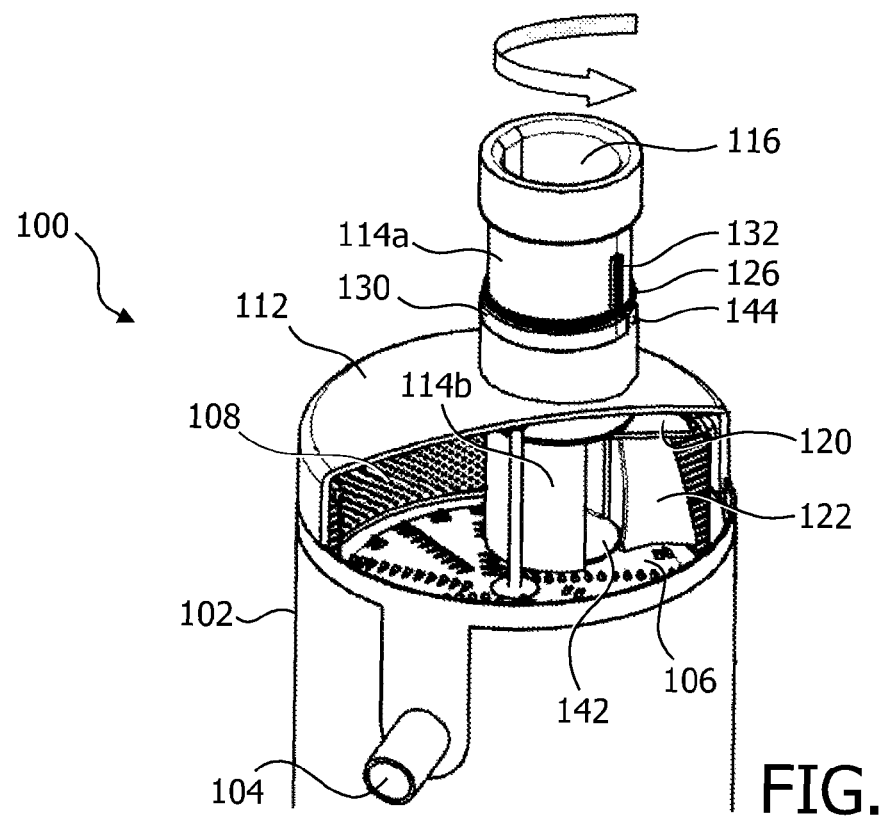

FIGS. 3a,b show the juicer 100 in the cleaning position without food pusher (FIG. 3a) and with food pusher 116 (FIG. 3b). To change the position of the feed tube 114a,b from the juicing position into the cleaning position, it has to be turned in direction of the arrows and to be held there. Otherwise, the spring 126 would force the food tube 114a,b back into the juicing position. Thanks to the stopping elements longitudinal protrusion 128 in the feed tube 114a,b and corresponding groove in the food pusher 116, the feed tube 114a,b and the food pusher 116 do not get askew to each other during the change of position from juicing position and cleaning position, and the openings of the feed tube 114a,b and of the food pusher 116 stay aligned.

Figure 4B:
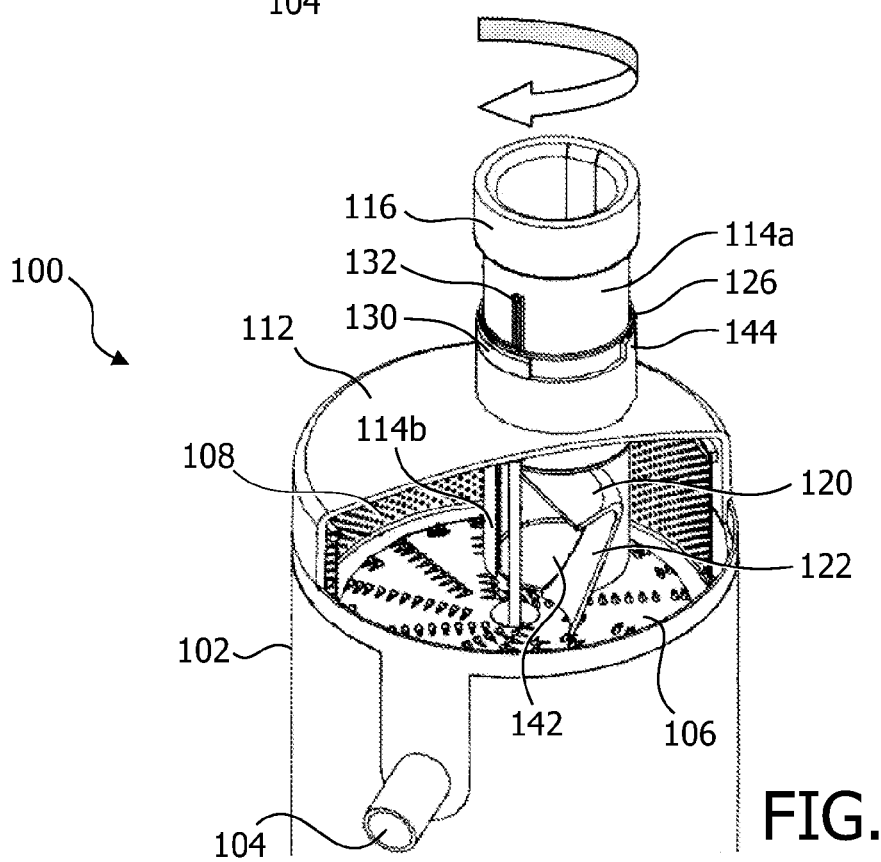

After cleaning of the filter sieve and release of the feed tube 116 by the user, the feed tube 116 returns along the direction of the arrows into the juicing position as is shown in FIGS. 4a,b, with inserted food pusher 116 in FIG. 4b and without food pusher in FIG. 4a. In the juicing position, the filter sieve 108 can be utilized on its whole circumference for filtering. The scraper element 122 assists the deflecting element 120 in deviating the pulp in direction of the openings of the feed tube 114a,b and the food pusher 116. The deflecting effect can be optimized for the respective juicer by adapting in particular the curvature and the angle of the deflecting element 120 with respect to the opening of the feed tube 114a,b.

In the cleaning position (see FIGS. 3a,b), the scraper element abuts with the inner side of the filter sieve 108. As the grating disk 106 together with the filter sieve 108 continues to rotate, the scraper element 122 removes the pulp along the whole inner circumference of the filter sieve 108. The removed pulp is partly deflected immediately in direction of the openings of the feed tube 114a,b and the food pusher 116 and is collected inside the food pusher (see FIG. 3b). Partly it falls down on to the grating disk 106 and is grated and centrifuged once more. This considerably improves the efficiency of extracting juice from the provided fruits or vegetables. If the user moves the feed tube 114a,b into the cleaning position while having removed the food pusher 116, all the pulp will be grated and centrifuged again (see FIG. 3a).

In juicers like shown in the present example with a cylindrical filter sieve 108, the juicing efficiency is inherently high, because the residence time of the pulp in the receptacle formed by the grating disk 106 and the filter sieve 108 is high. A drawback is, that the pulp accumulates on the inner side of the filter sieve and clogs the filter sieve. The filter sieve 108 of the juicer 100 shown in FIGS. 1 to 4 must be cleaned form pulp on the average after two to three refills with e.g. apples or carrots. The user does not need to interrupt the juice making to disassemble the juicer 100 for cleaning the filter sieve 108 as with former juicers. The users just needs to rotate the feed tube 114a,b for some seconds into the cleaning position to free the inner side of the filter sieve 108 from clogging pulp. This can be done with the food pusher 116 still inside the feed tube 114a,b to collect pulp and dispose of it, when removing the food pusher 116 to add more fruits or vegetables into the juicer 100. Thanks to the slidable sleeve around the food pusher 116 mentioned before, no pulp will be spilled during removal of the food pusher 116. This can also be done with the food pusher 116 already removed and e.g. while filling new fruits and vegetables into the feed tube 114a,b.

When optimizing the scraper element 122 for the respective juicer 100, one will consider optimizing the angle of the scraper element 122 and its pressure against the inner side of the filter sieve 108 to efficiently remove the pulp without pressing some of the pulp through the filter sieve 108 and by this staining the juice with pulp. To accommodate also persons who like juice with pulp, it is advantageous to provide various scraper elements or filter sieves 108 with various diameter or larger and smaller holes to have more or less pulp getting into the juice on the exterior of the filter sieve 108.

FIGS. 5a,b show a further example of a juicer 200 with pulp collecting pusher. The juicer 200 has not a cylindrical, but a frusto-conical filter sieve 208. Frusto-conical filter sieves have the advantage that they do not clog as fast as cylindrical filter sieves, but the juice extraction efficiency is less high because of shorter residence times of the pulp.

The juicer 200 comprises a motor block 202 for driving the grating disk 230 and the filter sieve 208 connected to the grating disk 230. The juice filtered through the filter sieve 208 is collected in the receptacle 204 and poured into a glass or a bottle or else through the spout 206. On the filter sieve 208 and the grating disk that are inserted in the receptacle 204 is place an assembly of a cover 222 with a feed tube 210 that is shown more in detail in FIG. 5a. The feed tube 210 as well as the food pusher 212 has openings 214, 216 for collecting the pulp inside the food pusher 212. In the present example, several openings are provided to collect pulp coming from all sides. During centrifuging, the filter sieve 208 hurls the pulp upwards. The pulp then falls on the peripheral deflecting element 218 of the lower part 210b of the feed tube, from where it slides into the food pusher 212. The pulp can also first be thrown against the inner side of the cover 222 or against the scraper elements 220, from where the pulp falls into the food pusher 212 or first onto the deflecting element 218.

From time to time, the feed tube 210 made from the lower part 210b with the openings 216, the scraper elements 220 and the deflecting element 218 and from the upper part 210a guiding the food pusher 212 may be rotated around its middle axis. Then, the scraper elements 220 remove the pulp adhering at the inner walls of the cover 222. Part of the pulp falls onto the deflecting element 218 and then into the food pusher 212. Part of the pulp is centrifuged again, thus extracting more juice. Because the openings 214, 216 in the food pusher 212 and in the feed tube 210 are so large stopping elements for aligning the openings 214, 216 like in the previous example are not necessary.

The food pusher of the present example has a bottom 226 that is a sieve. To extract even more juice, the pulp inside the food pusher 212 can be pressed against the sieve bottom 226 with the help of a pulp pusher 228 that is dimensioned to be insertable into the food pusher 212.

As in the previous example, the food pusher is provided with a sleeve 224 to avoid spilling the pulp when removing the food pusher 212. When the food pusher 212 is inserted in the feed tube 210, the sleeve 224 is hold by the upper rim of the feed tube 210. Due to gravitation, the sleeve 214 slides down the food pusher 212, when it is removed for adding fruits or vegetables and eventually for disposing of the pulp, and closes the openings 214.

Although having described several preferred embodiments of the invention, those skilled in the art would appreciate that various changes, alterations, and substitutions can be made without departing from the spirit and concepts of the present invention. The invention is, therefore, claimed in any of its forms or modifications with the proper scope of the appended claims. For example various combinations of the features of the following dependent claims could be made with the features of the independent claim without departing from the scope of the present invention. Furthermore, any reference numerals in the claims shall not be construed as limiting scope.

LIST OF REFERENCE NUMERALS 100 juicer
102 housing
104 spout
106 grating disk
108 filter sieve
110 switch
112 cover
114a,b feed tube
116 pusher
118 spring
120 deflecting element
122 scraper element
124 opening
126 spring
128 longitudinal protrusion
130 peripheral protrusion
132 protruding groove
134 opening
136 sleeve
138 groove
140 groove
142 bottom
144 abutment
146 opening
200 juicer
202 motor block
204 juice receptacle
206 spout
208 filter sieve
210a,b feed tube
212 pusher
214 opening
216 opening
218 deflecting element
220 scraper element
222 cover
224 sleeve
226 sieve bottom
228 pulp pusher
230 grating disk

The invention claimed is:

1. A juice extractor comprising a rotatable grating disk, a filter sieve surrounding the grating disk, a feed tube arranged above the grating disk, and a food pusher insertable into the feed tube to press food onto the grating disk;

the food pusher being hollow and having a first opening in a side thereof;

the feed tube having a second opening in communication with the first opening for enabling pulp produced during the grating of food to enter the food pusher and having a scraper element, said feed tube being arranged to be rotated between a first position for introducing food and grating it and a second position where the scraper element is urged against an inner side of the filter sieve for scraping pulp for entry into the food pusher.

2. The juice extractor according to claim 1 where the feed tube has a deflecting element to deflect pulp during grating through the first and second openings and into the food pusher.

3. The juice extractor according to claim 1 where the feed tube has a resilient element forcing for urging the feed tube from one of the first and second positions to the other position.

4. The juice extractor according to claim 3 where the resilient element urges the feed tube from the second to the first position.

5. The juice extractor according to claim 1 including stopping means for ensuring that the food pusher and the feed tube cannot be rotated with respect to each other.

6. A juice extractor comprising a rotatable grating disk, a filter sieve surrounding the grating disk, a feed tube arranged above the grating disk, and a food pusher insertable into the feed tube to press food onto the grating disk;

said food pusher being hollow and having an opening in a side thereof;

said juice extractor further including a slidable sleeve encompassing the food pusher and being slidable between a first position closing the opening and a second position leaving the opening in the side of the food pusher open.

7. The juice extractor according to claim 6 where the food pusher comprises a resilient element for urging the sleeve from one of first and second positions to the other position.

8. The juice extractor according to claim 7 where the resilient element urges the feed tube from the second to the first position.

* * * * *